(12) United States Patent
Chae et al.

(10) Patent No.: US 10,935,083 B2
(45) Date of Patent: Mar. 2, 2021

(54) CLUTCH DEVICE FOR AUTOMATIC TRANSMISSION

(71) Applicants: HYUNDAI MOTOR COMPANY, Seoul (KR); KIA MOTORS CORPORATION, Seoul (KR)

(72) Inventors: Minho Chae, Incheon (KR); Juhyeon Park, Suwon-si (KR); Yong Uk Shin, Suwon-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 108 days.

(21) Appl. No.: 16/456,422

(22) Filed: Jun. 28, 2019

(65) Prior Publication Data

US 2020/0116210 A1 Apr. 16, 2020

(30) Foreign Application Priority Data

Oct. 10, 2018 (KR) .................. 10-2018-0120456

(51) Int. Cl.
   *F16D 25/0638* (2006.01)
   *F16D 31/08* (2006.01)
   *F16D 25/12* (2006.01)
   *F16D 25/08* (2006.01)

(52) U.S. Cl.
   CPC ......... *F16D 25/0638* (2013.01); *F16D 25/12* (2013.01); *F16D 31/08* (2013.01); *F16D 2025/081* (2013.01)

(58) Field of Classification Search
   CPC ............................. F16D 25/0638; F16D 25/12
   See application file for complete search history.

(56) References Cited

U.S. PATENT DOCUMENTS

| | | | | |
|---|---|---|---|---|
| 5,586,632 A * | 12/1996 | Bigley | ............... | B60K 17/3515 |
| | | | | 192/69.41 |
| 6,347,695 B1 * | 2/2002 | Kuhn | ..................... | F16D 13/69 |
| | | | | 192/70.12 |
| 9,255,634 B2 | 2/2016 | Sasaki et al. | | |
| 2008/0314711 A1 * | 12/2008 | Jayaram | .............. | F16H 63/3023 |
| | | | | 192/85.34 |

(Continued)

FOREIGN PATENT DOCUMENTS

JP 2015-190526 11/2015

*Primary Examiner* — Stacey A Fluhart
(74) *Attorney, Agent, or Firm* — Brinks Gilson & Lione

(57) ABSTRACT

A clutching device of an automatic transmission may include: a clutch drum connected with a first rotation element, a clutch connected with the clutch drum and also connected with a second rotation element for selective torque delivery, and a piston unit to operate the clutch. In particular, the piston unit includes: a first piston moving toward the clutch by a hydraulic pressure; a spring retainer arranged on the first rotation element; a support drum arranged in the first piston; a second piston arranged in the support drum and moving in an axial direction of the first rotation element; a first return spring applying restoring force to the first piston; a second return spring applying restoring force to the second piston; a latch spring applying pressure to the clutch when the first piston moves toward the clutch; and a latch device selectively limiting bidirectional movement of the first piston.

16 Claims, 6 Drawing Sheets

(56) References Cited

U.S. PATENT DOCUMENTS

| | | | |
|---|---|---|---|
| 2010/0179026 A1* | 7/2010 | Grochowski | F16D 25/0638 |
| | | | 477/180 |
| 2013/0075222 A1* | 3/2013 | Ari | F16D 48/062 |
| | | | 192/85.63 |
| 2014/0291103 A1* | 10/2014 | Lister | F16D 25/061 |
| | | | 192/70.23 |
| 2016/0178018 A1* | 6/2016 | Margraf | F16D 25/0638 |
| | | | 192/85.63 |
| 2019/0178305 A1* | 6/2019 | Chae | F16D 25/0638 |
| 2020/0018393 A1* | 1/2020 | Chae | F16H 63/3026 |

* cited by examiner

CLUTCH DEVICE FOR AUTOMATIC TRANSMISSION

CROSS-REFERENCE TO RELATED APPLICATION

This application claims priority to and the benefit of Korean Patent Application No. 10-2018-0120456, filed on Oct. 10, 2018, the entire contents of which are incorporated herein by reference.

FIELD

The present disclosure relates to a clutch device of an automatic transmission that connects or disconnects torque transmission between two rotation elements.

BACKGROUND

The statements in this section merely provide background information related to the present disclosure and may not constitute prior art.

An environmentally-friendly technology of a vehicle has become a core technology in the automobile industry, and advanced car makers have focused their energy on the development of an environmentally-friendly vehicle and also meeting environmental and fuel efficiency regulations.

To improve the fuel efficiency, various research has been conducted, such as a high efficiency engine, a high efficiency transmission, a light-weight vehicle body, etc. In particular, in the transmission field, a double clutch transmission and an automated manual transmission have been developed to achieve the energy efficiency of a manual transmission and also convenience of an automatic transmission.

In such a transmission, dry or wet clutches are used to transmit an engine torque, and a clutch used for the transmission requires a large torque capacity and precise control.

We have discovered that until friction members of clutch disks and clutch plates of such a clutch meet each other, a rapid operating speed is required for immediate starting of power transmission, and after the friction members have met, large engaging force is required for providing power delivery through the clutch.

In addition, operating efficiency may be further improved when precise control between a rapid operating speed and large engagement force is performed.

We have also found that a clutch may be damaged by fatigue accumulation through repeating application of a large engagement force and a rapid operating speed.

The above information disclosed in this Background section is only for enhancement of understanding of the background of the present disclosure and therefore it may contain information that does not form the prior art that is already known to a person of ordinary skill in the art.

SUMMARY

The present disclosure provides a clutch device of an automatic transmission having advantages of enhanced shifting responsiveness and precision controlling.

A clutching device of an automatic transmission according to an exemplary form of the present disclosure may include: a clutch drum connected with a first rotation element, a clutch connected with the clutch drum and also connected with a second rotation element so as to connect and disconnect torque delivery between the first and second rotation elements, and a piston unit to operate the clutch to connect the torque delivery between the first and second rotation elements. In particular, the piston unit may include; a first piston forming a first sealed space with the first rotation element and the clutch drum and moving toward the clutch by a hydraulic pressure supplied to the first sealed space through a first hydraulic line formed in the first rotation element; a spring retainer forming a second sealed space with the first rotation element and the first piston and arranged on the first rotation element; a support drum arranged in the first piston, wherein one end of the support drum is supported by the first rotation element and the other end of the support drum is supported by the spring retainer in sealed state; a second piston forming a third sealed space with the first rotation element and the spring retainer, arranged in the support drum, and moving in an axial direction of the first rotation element when a hydraulic pressure is supplied to the third sealed space through a second hydraulic line formed in the first rotation element; a first return spring stored in the first sealed space and applying restoring force to the first piston; a second return spring disposed between the second piston and the support drum and applying restoring force to the second piston; a latch spring inserted in an insert groove formed in the first piston and applying pressure to the clutch when the first piston moves toward the clutch; and a latch device selectively limiting bidirectional movement of the first piston by a cam operation between a stopper ring having a stopper selectively inserted into a stopper hole formed in the support drum and the second piston.

The latch device may include a supporting end formed in an interior circumference of the first piston; a plurality of stopper holes formed at an external circumference of the support drum; a cam surface formed at an exterior circumference of the second piston and including an inclined portion; and a stopper ring disposed between the support drum and the second piston, and integrally formed with a plurality of stoppers selectively inserted into the plurality of stopper holes formed in the support drum. In particular, stoppers of the plurality of stoppers are selectively locked with the supporting end as the stopper ring moves along the cam surface.

The stopper ring may be partially cut out such that a diameter of the stopper ring is shortened and elongated in a radial direction.

A width in a circumference direction of the stopper hole may be longer than a width in a circumference direction of the stopper.

The clutch may be connected with the second rotation element through a clutch hub.

An exterior rim of the first piston and the first rotation element may be coaxially disposed, the exterior rim of the first piston tightly may contact the clutch drum interposing a seal, a supporting end may be protruded from an interior circumference of the exterior rim, and a seal may be interposed between an interior end portion of the first piston and the first rotation element such that the first piston tightly contacts an input shaft.

The spring retainer may be abutted by a first snap ring inserted in the first rotation element in direction toward the clutch so as to support the first return spring.

The spring retainer may support the first return spring, and the spring retainer may be arranged on the first rotation element and forms a third sealed space with the second piston and the first rotation element, and the second piston may move in an axial direction of the first rotation element when a hydraulic pressure is supplied to the third sealed space through a second hydraulic line.

The support drum may be abutted by a second snap ring inserted in the first rotation element in an opposite direction toward the clutch.

The second piston may tightly contact the first rotation element and the support drum and slidably arranged on the first rotation element in the axial direction of the first rotation element interposing seals, respectively.

One end of the first return spring may be supported by the spring retainer and the other end of the first return spring may be supported by the groove formed in the first piston, and the first return spring is formed as a coil spring.

One end of the second return spring may be supported by the second piston and the other end of the second return spring may be supported by the support drum, and the second return spring may be formed as a plate spring.

The latch spring may be formed as a plate spring having a disk-shape.

The latch spring may be formed by overlapping plural plate springs such that elastic force of the latch spring is greater than elastic force of the second return spring.

The first rotation element may be an input shaft and receives an output torque of an engine; and the second rotation element may be one rotation element of three rotation elements of a planetary gear set.

A third hydraulic line may be formed in the first rotation element at a location between the first hydraulic line and the second hydraulic line so as to supply compensation hydraulic pressure to the second sealed space.

According to an exemplary form of the present disclosure, dual pistons and a latch device are used for operation of a clutch that transmits torque, thereby improving shifting responsiveness due to better gap control between friction members, and also improving power delivery efficiency by providing a large engagement force.

Due to sequentially controlling of the first and second pistons, fatigue accumulation caused to the friction members may be significantly reduced, thereby reducing possibility of damage to the clutch.

In the case of releasing the clutch, drag loss of friction members may be reduced while enhancing reliability of controlling the clutch by canceling centrifugal force of fluid remaining in spaces between the first piston and the clutch drum, since the returning operation of the pistons initiated by the first return spring by the compensation hydraulic pressure supplied to a space between the first piston and the support drum.

Since the return springs initiate the returning operation of the pistons, unstableness of returning operation of pistons may be reduced by minimizing effect of unstableness of low initial hydraulic pressure when the hydraulic pressure is solely used for returning the pistons.

Further, the hydraulic pressure can be removed or decreased by the latch device and the latch spring during operation of the clutch, thereby reducing power loss of a pump and fuel consumption can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
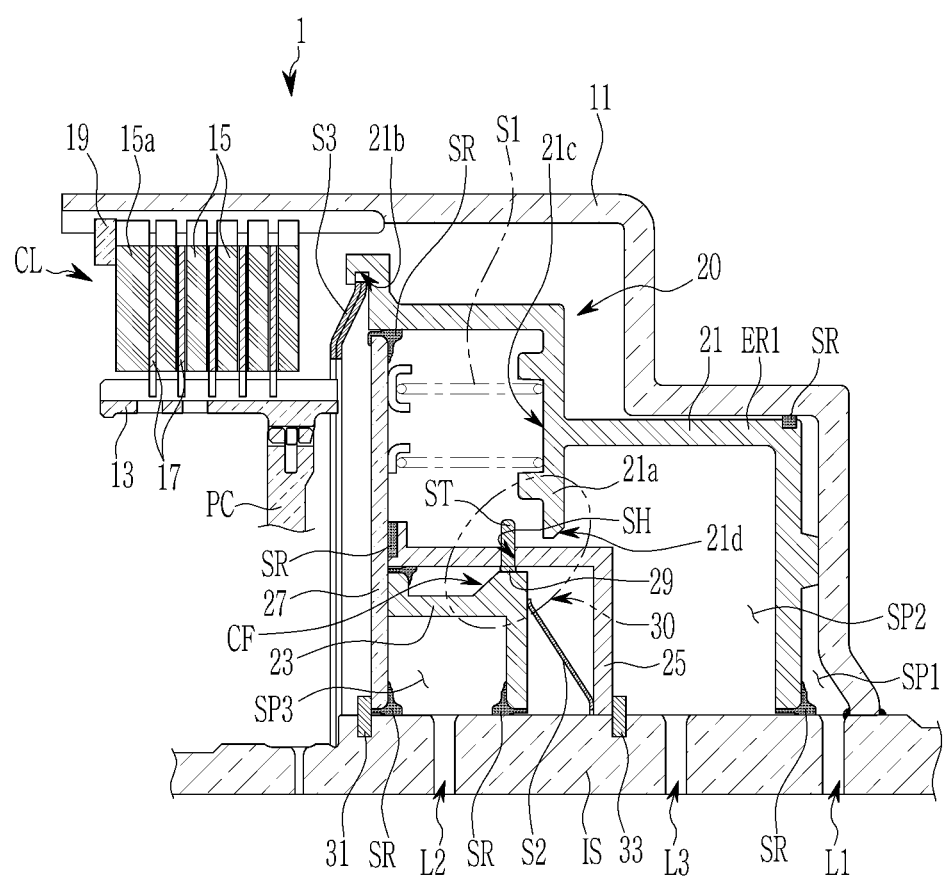
FIG. 1 is a cross-sectional view of a clutching device of an automatic transmission according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

Figure 2:
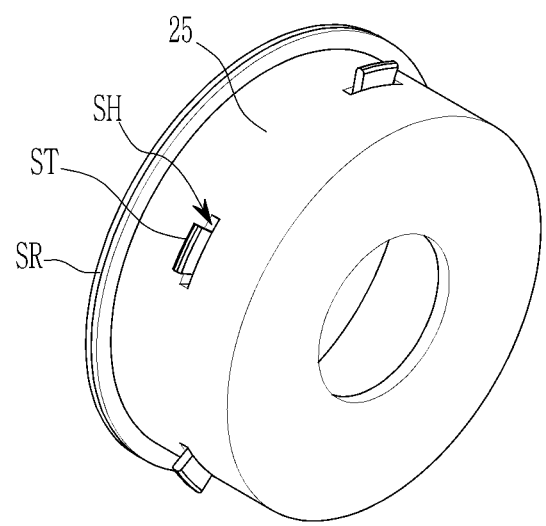
FIG. 2 is an assembled perspective view of a support drum and a stopper ring applied to a clutching device of an automatic transmission according to an exemplary form of the present disclosure.
Figure 3:
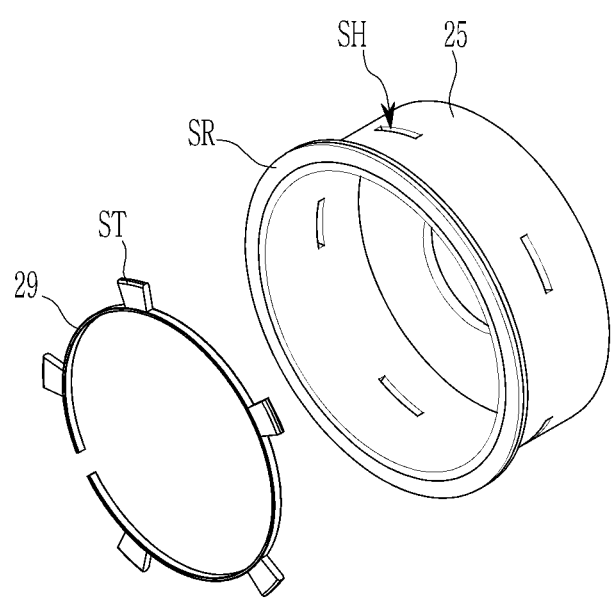
FIG. 3 is an exploded perspective view of a support drum and a stopper ring applied to a clutching device of an automatic transmission according to an exemplary form of the present disclosure.

FIG. 1 is a cross-sectional view of a clutching device of an automatic transmission according to an exemplary form of the present disclosure. FIG. 2 is an assembled perspective view of a support drum and a stopper ring applied to a clutching device of an automatic transmission according to an exemplary form of the present disclosure. And FIG. 3 is an exploded perspective view of a support drum and a stopper ring applied to a clutching device of an automatic transmission according to an exemplary form of the present disclosure.

Referring to FIG. 1, a clutching device of an automatic transmission is a clutching device that is arranged between two rotation elements so as to control torque transmission therebetween.

The exemplary form takes an example that torque transmission between an input shaft IS and a planet carrier PC of a planetary gear set (not shown) as two rotation elements is controlled, i.e., connected or disconnected.

The planetary gear set is exemplified as a single pinion planetary gear set, however, it should not be understood that the disclosure is limited thereto. Various other types of planetary gear set, e.g., a double pinion planetary gear set, a compound planetary gear set, etc., may be applied with a clutching device. The planetary gear set includes three rotation elements of a sun gear, a planet carrier, and a ring gear. As well known in the art, the planet carrier rotatably supports a plurality of pinion gears that are externally gear-meshed with the sun gear, and the ring gear is internally gear-meshed with the plurality of pinion gears.

A clutching device according to an exemplary form includes: a clutch CL connected with a clutch drum 11 and also connected with a clutch hub 13, and a piston unit 20 that controls an operation of the clutch CL. The clutch controls torque transmission between the clutch drum 11 and the clutch hub 13 according to an operating state of friction members 15 and 17 installed in the clutch CL in response to the operation of the piston unit 20.

The clutch drum 11 is fixedly connected with the input shaft IS so as to rotate at a same speed. The input shaft is a mere example of a member that receives or outputs a torque. Thus, it may be connected with the engine output side so as to receive an engine torque, or it may be connected to a rotation element of another planetary gear set included in an automatic transmission.

The clutch hub 13 is fixedly connected with the planet carrier PC so as to rotate at a same speed. The planet carrier PC is a mere example of a member that receives or outputs a torque. Thus, it may be understood that the clutch hub 13 may be connected with another rotation element of the planetary gear set. A plurality of clutch plates 15 as the friction members of the clutch CL are spline-engaged with an interior circumference of the clutch drum 11. A plurality of clutch disks 17 as the friction members of the clutch CL are spline—engaged with an exterior circumference of the clutch hub 13. Thus, when the clutch CL is operated, the friction members of the clutch plates 15 and the clutch disks 17 frictionally meet each other, thereby enabling torque transmission between the clutch drum 11 and the clutch hub 13, which means torque transmission between the input shaft IS and the planet carrier PC is enabled.

The plurality of clutch disks 17 are alternately arranged with the plurality of clutch plates 15, and an assembly of the clutch disks and plates 17 and 15 is supported by a snap ring 19.

The piston unit 20 includes a dual piston arrangement of first and second pistons 21 and 23, a support drum 25 disposed between the first and the second pistons 21 and 23, a spring retainer 27 for applying a restoring force to the first and second pistons 21 and 23, a latch spring S3 for applying pressure to the first and second return spring S1 and S2, and the clutch CL, and a latch device selectively limit a stroke of the first piston 2.

The piston unit 20 operates to apply engagement pressure to the clutch CL by application of hydraulic pressure to the piston unit 20.

The first piston 21 forms a first sealed space SP1 with the input shaft IS and the clutch drum 11, and a first hydraulic line L1 is formed in the input shaft IS. Therefore, the first piston 21 moves toward the clutch CL when a hydraulic pressure is supplied to the first sealed space SP1 through the first hydraulic line L1. The forward movement of the first piston 21 pushes the clutch CL such that the clutch discs and the clutch plates 15 and 17 to contact each other.

An exterior rim ER1 of the first piston 21 and the input shaft IS are coaxially disposed. The exterior rim ER1 of the first piston 21 tightly contacts the clutch drum 11 interposing a seal SR. A supporting end 21a having a circular-shape is protruded from an interior circumference of the exterior rim ER1. A seal SR is interposed between an interior end portion of the first piston 21 and the input shaft IS such that the first piston 21 tightly contacts the input shaft IS.

The spring retainer 27 is arranged on the input shaft IS and forms a second sealed space SP2 with the first piston and the input shaft IS.

The spring retainer 27 tightly contacts the input shaft IS and the first piston 21 interposing seals SR, respectively. And the spring retainer 27 is abutted by a first snap ring 31 inserted in the input shaft IS in a direction toward the clutch CL so as to support the return spring S1.

Referring to FIG. 2 and FIG. 3, the support drum 25 is arranged in the first piston 21, is abutted by the second snap ring 33 inserted in the input shaft IS in an opposite direction toward the clutch CL, and tightly contacts the spring retainer 27 interposing a seal SR. That is, one end of the support drum 25 is supported by the input shaft IS and the other end of the support drum 25 is supported by the spring retainer 27 in sealed state.

The support drum 25 tightly contacts the spring retainer 27 interposing the seal SR.

The second piston 23 is arranged between the input shaft IS and the support drum 25, and tightly contacts the input shaft IS and the support drum 25 interposing seals SR, respectively.

The second piston 23 tightly contacts the input shaft IS and the support drum 25 and slidably arranged on the input shaft IS in an axial direction of the input shaft IS.

The second piston 23 forms a third sealed space SP3 with the input shaft IS and the spring retainer SR, and a second hydraulic line L2 is formed in the input shaft IS. Therefore, the second piston 23 moves in an axial direction of the input shaft IS when a hydraulic pressure is supplied to the third sealed space SP3 through the second hydraulic line L2.

The first return spring S1 is stored in the first sealed space SP1 and is abutted by the first piston 21 and the spring retainer 27, so as to apply a restoring force to the first piston 21.

One end of the first return spring S1 is supported by the spring retainer 27 and the other end of the first return spring S1 is supported by a groove 21c formed in the first piston 21. The first return spring may be formed as a coil spring.

Herein, the spring retainer 27 supports the first return spring S1, and forms a second sealed space SP2 together with the support drum 25 and the second piston 23. The second piston 23 moves by hydraulic pressure supplied to the second through the second hydraulic line L2 formed in the input shaft IS.

The second return spring S2 is disposed between the second piston 23 and the support drum 25, and supplies restoring force to the second piston 23.

In one form, the second return spring S2 is a plate spring, and one end of the second return spring S2 is supported by the second piston 23 and the other end of the second return spring S2 is supported by the support drum 25.

In an exemplary form of the present disclosure, the second return spring S2 exemplified as a plate spring, however, the scope of the present disclosure is not limited thereto. The second return spring S2 may be a metal material elastic member for supplying restoring force to the second piston 23 between the second piston 23 and the support drum 25.

The latch spring S3 is inserted in an insert groove 21b formed at the first piston 21, and applies pressure to the clutch CL when the first piston 21 moves toward the clutch CL.

The latch spring S3 may be formed as a plate spring having a disk-shape, and the latch spring S3 may be formed by overlapping two plate springs such that elastic force of the latch spring S3 is greater than elastic force of the second return spring S2.

Referring to FIG. 2 and FIG. 3, the latch device 30 selectively limits bidirectional movement (forward and backward movement) of the first piston 21 by a cam operation between a stopper ring having a stopper selectively inserted into a stopper hole formed in the support drum and the second piston.

The latch device 30 may include a supporting end 21a, a stopper hole SH, a cam surface CF, and a stopper ring 29.

The supporting end 21a is formed in an interior circumference of the exterior rim ER1 and has a disc shape. A slanted surface 21d is formed at an end portion of the supporting end 21a opposite to the clutch CL.

The stopper hole SH is formed at an external circumference of the support drum 25 at a predetermined interval, and is formed in plural.

The cam surface CF protrudes outward along the periphery of the outer circumferential surface of the second piston 23 to form an inclined surface.

The stopper ring 29 is disposed between the support drum 25 and the second piston 23, and a plurality of stopper ST is integrally formed in the stopper ring 29. The plurality of stopper ST is inserted in the stopper holes SH, respectively. The stoppers ST moves along the cam surface CF according to the operation of the second piston 23 so that the stopper is selectively locked with the supporting end 21a. Therefore, the stopper ST of the stopper ring may selectively limit the movement of the first piston 21.

Referring to FIG. 3, the stopper ring 29 is formed as a ring shape partially cut out such that the stopper ring 29 is elongated and shortened in a radial direction. In another form, a width in a circumference direction of the stopper hole SH is longer than a width in a circumference direction of the stopper ST to form a gap between the stopper hole SH and the stopper ST.

Further, a third hydraulic line L3 is formed in the input shaft IS at a location between the first hydraulic line L1 and the second hydraulic line L2. A compensation hydraulic pressure is supplied to the second sealed space S2 formed between the first piston 21 and the support drum 25 through the third hydraulic line L3.

Figure 4:
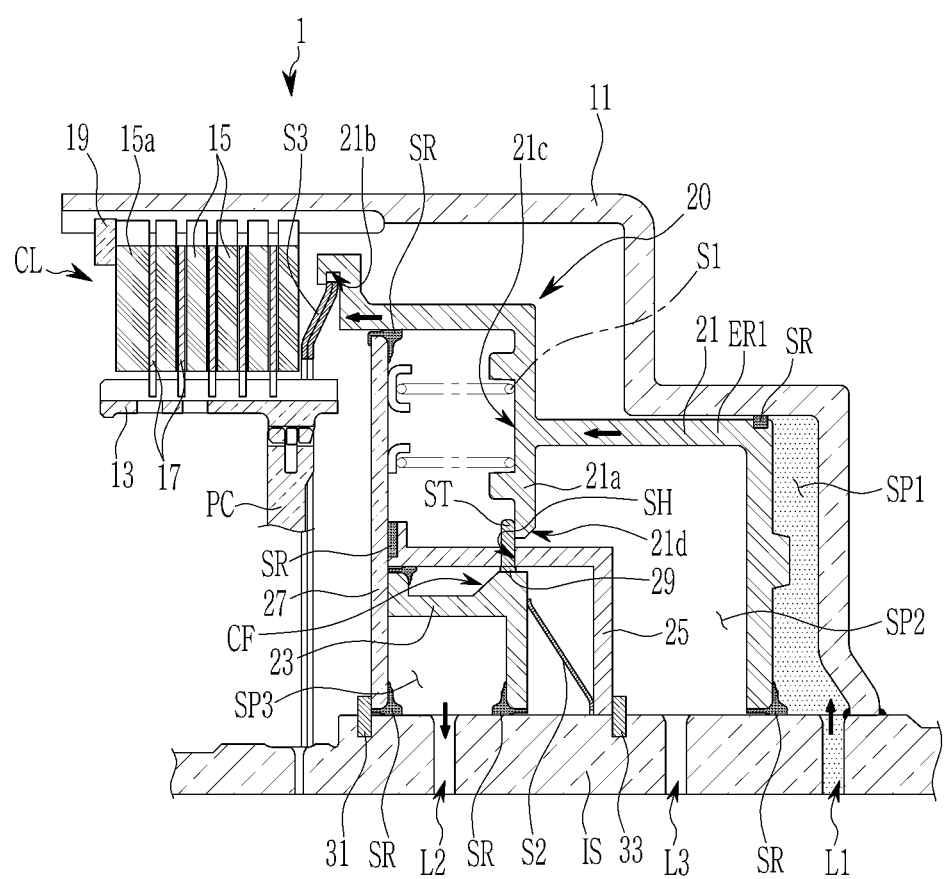
FIG. 4 to FIG. 6 are cross-sectional views illustrating operating stages of a clutching device of an automatic transmission according to an exemplary form of the present disclosure.
Figure 5:
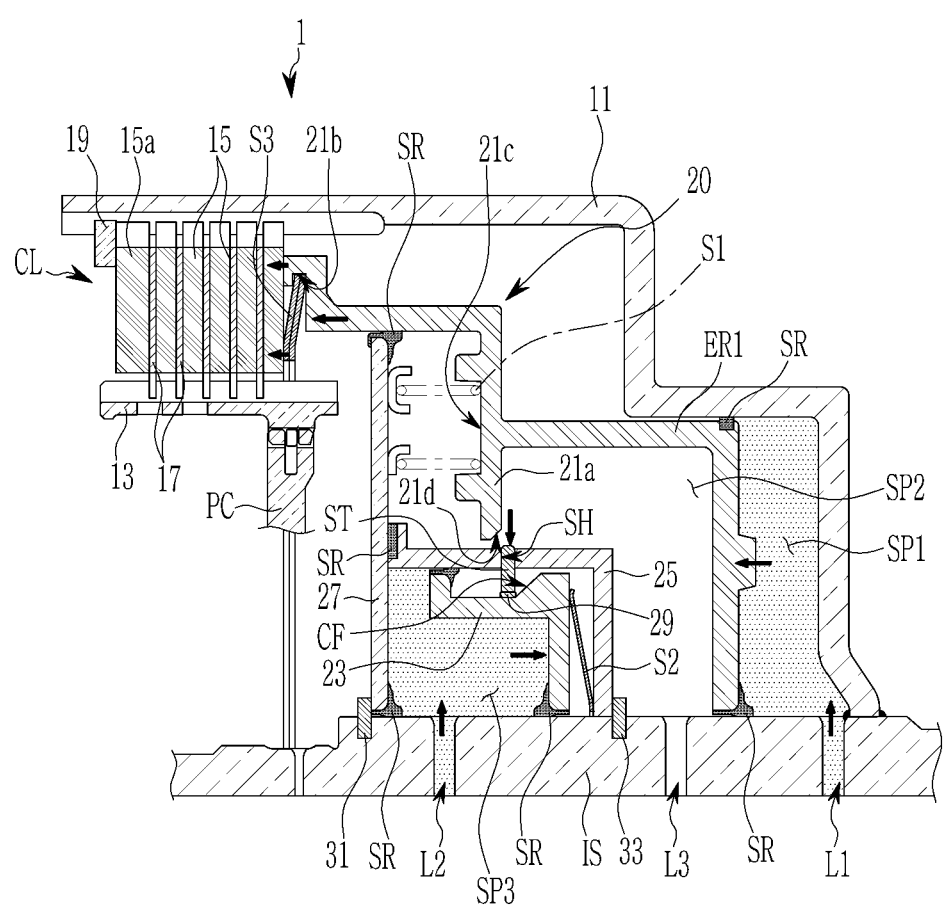
Figure 6:
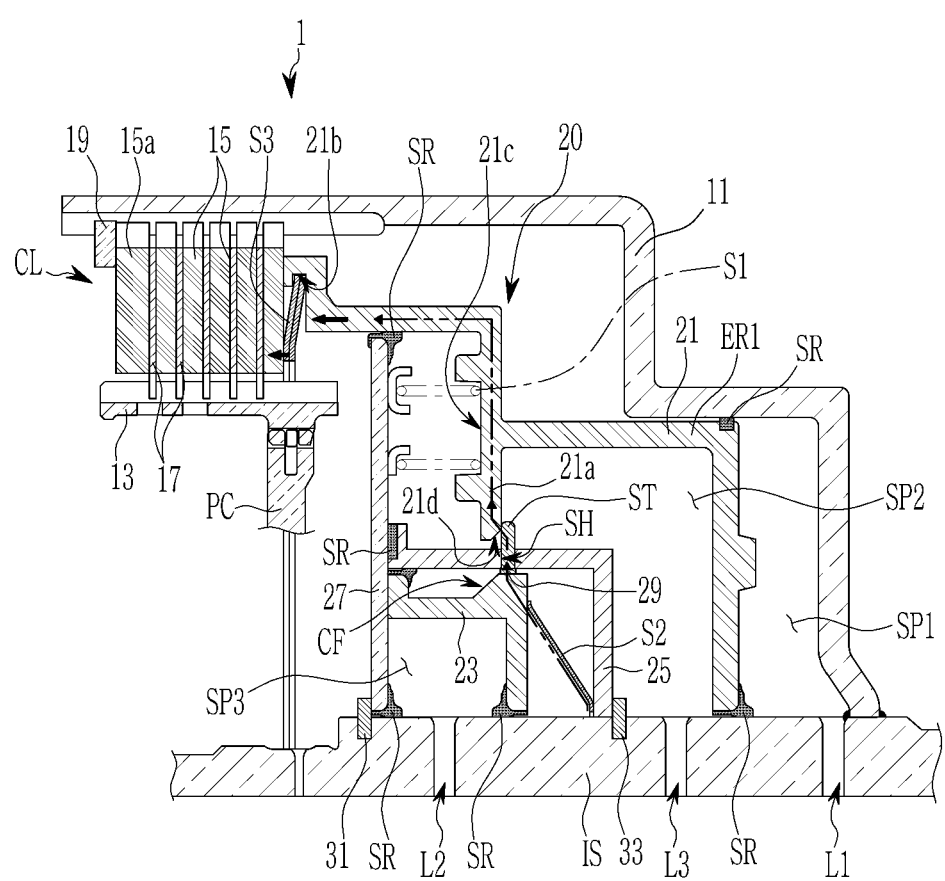

FIG. 4 to FIG. 6 are cross-sectional views illustrating operating stages of a clutching device of an automatic transmission according to an exemplary form of the present disclosure.

Operation of a clutching device according to an exemplary form is hereinafter described in detail with reference to FIG. 1 and FIG. 4 to FIG. 6.

Referring to FIG. 1, the clutch drum 11 receives an input torque through the input shaft IS.

At this time, the second piston 23 moves toward the clutch CL by elastic force of the second return spring S2, and the stopper ST protrudes outward of the support drum 25 through the stopper hole SH.

When hydraulic pressure is supplied to the first seal space SP1 formed between the clutch drum 11 and the first piston 21 through the first hydraulic line L1 to operate the clutch CL referring to FIG. 4, the first piston 21 moves toward the clutch CL and the supporting end 21a is supported by the stopper ST.

Simultaneously, the latch spring S3 is deformed toward the clutch CL together with the first piston 21, and a gap between the plurality of clutch plate 15 and the plurality of clutch disk 17 is controlled just before frictional contact between the clutch plate 15 and the clutch disc 17.

Referring to FIG. 5, in a state where the hydraulic pressure is supplied to the first sealed space SP1 through the first hydraulic line L1, the hydraulic pressure is supplied to the third sealed space SP3 formed among the spring retainer 27, the support drum 25 and the second piston 23 through the second hydraulic line L2.

Then, the second piston 23 overcomes the elastic force of the second return spring S2 and moves opposite to the clutch CL.

At this time, the stopper ring 29 moves downward along the cam surface CF by self-elastic force and the diameter of the stopper ring 29 becomes shortened. Accordingly, the stopper ST moves radially inward the support drum 25 through the stopper hole SH, and the stopper ST and the supporting end 21a are released.

Then, the first piston 21 moves toward the clutch CL and pushes the clutch plate 15 together with the latch spring S3 by the hydraulic pressure supplied to the first sealed space SP1 as the moving speed of the first piston 21 is decreased.

Therefore, the end portion of the first piston 21 pushes the clutch CL and the plurality of clutch plate 15 and the plurality of clutch disk 17 are in contact with each other such that the rotational power of the input shaft IS is delivered through the clutch CL.

Referring to FIG. 6, when the hydraulic pressure supplied to the third sealed space SP3 is removed, the second piston 23 moves opposite to the clutch and returns to its initial position by the elastic force of the second return spring S2. Accordingly, the stopper ring 29 moves upward along the cam surface CF and the diameter of the stopper ring 29 is increased so that the stopper ST is protruded outwardly through the stopper hole SH and the stopper ST supports the supporting end 21a of the first piston 21 in opposite to the clutch CL.

Then, when the hydraulic pressure supplied to the first sealed space SP1 is removed, the first piston 21 maintains to push the clutch CL in a state where the supporting end 21a of the first piston 21 is supported by the stopper ST. Accordingly, the plurality of clutch plate 15 and the plurality of clutch disk 17 are in contact with each other by the elastic force of the latch spring S3 such that the rotational power of the input shaft IS can be delivered through the clutch CL.

As described above, due to sequentially controlling the first piston 21 and the second piston 23, the rotational power of the input shaft IS can be transferred to the planetary carrier PC of the planetary gear set PG through the clutch CL with rapid shifting responsiveness and large engaging force.

At this time, the hydraulic pressure can be removed or decreased by the latch device 30 and the latch spring S3 during operation of the clutch, thereby reducing power loss of a pump and fuel consumption can be improved.

Meanwhile, when the hydraulic pressure is instantaneously supplied and exhausted through the second hydraulic line L2 in order to release the operation of the clutching device, the second piston 23 moves toward opposite to the clutch overcoming the elastic force of the second return spring S2 and then returns to the initial position toward the clutch by the second return spring S2.

Then, the stopper ring 29 moves downward along the cam surface CF and the diameter of the stopper ring 29 becomes shortened, therefore, the stopper ST moves radially inward the support drum 25 through the stopper hole SH and the engagement of the stopper ST and the supporting end 21a are released. After then, the second piston 23 moves upward along the cam surface CF and the diameter of the stopper ring 29 is increased so that the stopper ST is outwardly protruded through the stopper hole SH.

In a time when the engagement of the stopper ST and the supporting end 21a are released by decreasing the diameter of the stopper ring 29, the stopper ST moves downwardly along the slanted surface 21d formed in the supporting end 21a and the first piston 21 returns to the initial position by the elastic force of the first return spring 51 and the latch spring S3. Further, when the hydraulic pressure is supplied to the sealed space SP2 through the third hydraulic line L3 during the returning operation of the first piston 21, the hydraulic pressure is supplied to the sealed space SP2 acts as a compensation hydraulic pressure that cancels centrifugal forces applied to the remaining fluid in the first sealed space SP1, and therefore, drag loss of friction members in the clutch can be reduced.

As described above, according to a clutching device of the first and second exemplary forms, a shifting responsiveness is improved by rapid initial operating speed by employing dual pistons of the first and second pistons 21 and 23. In addition, precise control between friction members is enabled by precise control of the hydraulic pressure supplied to the second sealed space SP2.

Due to sequentially controlling of the first and second pistons 21 and 23, fatigue accumulation caused to the friction members may be significantly reduced, thereby reducing possibility of damage to the clutch CL.

In the case of releasing the clutch CL, drag loss of friction members may be reduced while enhancing reliability of controlling the clutch CL by canceling centrifugal force of fluid remaining in spaces between the first piston 21 and the clutch drum 11, since the returning operation of the piston 21 and 23 initiated by the first returning spring S1 and the latch spring S3 is accelerated by the compensation hydraulic pressure supplied to a space between the first piston 21 and the support drum 25 through the third hydraulic line L3.

Since the first spring S1 initiate the returning operation of the first piston 21, unstableness of returning operation of pistons may be reduced by minimizing effect of unstableness of low initial hydraulic pressure when the hydraulic pressure is solely used for returning the pistons.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

1: clutch device
CL: clutch
11: clutch drum
13: clutch hub
15: clutch plate
17: clutch disk
19: snap ring
20: piston unit
21,23: first, second piston
21a: supporting end
25: support drum
27: spring retainer
29: stopper ring
SH: stopper hole
ST: stopper
S1,S2: first, second return spring
S3: latch spring
30: latch device
31,33: first, second stopper
IS: input shaft
L1,L2,L3: first, second, third hydraulic line
SR: sealing
PC: planetary carrier

What is claimed is:

1. A clutching device of an automatic transmission, comprising:
    a clutch drum connected with a first rotation element;
    a clutch connected with the clutch drum and also connected with a second rotation element, and configured to connect and disconnect torque delivery between the first and second rotation elements; and
    a piston unit to operate the clutch to connect the torque delivery between the first and second rotation elements, wherein the piston unit includes:
        a first piston forming a first sealed space with the first rotation element and the clutch drum and moving toward the clutch by a hydraulic pressure supplied to the first sealed space through a first hydraulic line formed in the first rotation element;
        a spring retainer forming a second sealed space with the first rotation element and the first piston and arranged on the first rotation element;
        a support drum arranged in the first piston, wherein a first end of the support drum is supported by the first rotation element in a sealed state and a second end of the support drum is supported by the spring retainer in a sealed state;
        a second piston forming a third sealed space with the first rotation element and the spring retainer, arranged in the support drum, and moving in an axial direction of the first rotation element when a hydraulic pressure is supplied to the third sealed space through a second hydraulic line formed in the first rotation element;
        a first return spring stored in the second sealed space and applying restoring force to the first piston;
        a second return spring disposed between the second piston and the support drum and applying restoring force to the second piston;
        a latch spring inserted in an insert groove formed in the first piston and applying pressure to the clutch when the first piston moves toward the clutch; and
        a latch device selectively limiting bidirectional movement of the first piston by a cam operation between a stopper ring and the second piston.

2. The clutching device of claim 1, wherein the latch device includes:
    a supporting end formed in an interior circumference of the first piston;
    a plurality of stopper holes formed at an external circumference of the support drum;
    a cam surface formed at an exterior circumference of the second piston and including an inclined portion; and
    a stopper ring disposed between the support drum and the second piston, and integrally formed with a plurality of stoppers selectively inserted into the plurality of stopper holes formed in the support drum;
    wherein stoppers of the plurality of stoppers are selectively locked with the supporting end as the stopper ring moves along the cam surface.

3. The clutching device of claim 2, wherein:
    the stopper ring is partially cut out such that a diameter of the stopper ring is shortened and elongated in a radial direction.

4. The clutching device of claim 2, wherein:
    a width in a circumference direction of a stopper hole of the plurality of stopper holes is longer than a width in a circumference direction of a stopper of the plurality of stoppers.

5. The clutching device of claim 1, wherein:
    the clutch is connected with the second rotation element through a clutch hub.

6. The clutching device of claim 1, wherein:
    an exterior rim of the first piston and the first rotation element are coaxially disposed, the exterior rim of the first piston tightly contacts the clutch drum interposing a seal, a supporting end is protruded from an interior circumference of the exterior rim, and a seal is interposed between an interior end portion of the first piston and the first rotation element such that the first piston tightly contacts an input shaft.

7. The clutching device of claim 1, wherein:
the spring retainer is abutted by a first snap ring inserted in the first rotation element in direction toward the clutch so as to support the first return spring.

8. The clutching device of claim 1, wherein:
the spring retainer supports the first return spring, and the spring retainer is arranged on the first rotation element.

9. The clutching device of claim 1, wherein:
the support drum is abutted by a second snap ring inserted in the first rotation element in an opposite direction toward the clutch.

10. The clutching device of claim 1, wherein:
the second piston tightly contacts the first rotation element and the support drum and slidably arranged on the first rotation element in the axial direction of the first rotation element interposing seals, respectively.

11. The clutching device of claim 1, wherein:
a first end of the first return spring is supported by the spring retainer, a second end of the first return spring is supported by the groove formed in the first piston, and the first return spring is formed as a coil spring.

12. The clutching device of claim 1, wherein:
a first end of the second return spring is supported by the second piston, a second end of the second return spring is supported by the support drum, and the second return spring is formed as a plate spring.

13. The clutching device of claim 1, wherein:
the latch spring is formed as a plate spring having a disk-shape.

14. The clutching device of claim 1, wherein:
the latch spring is formed by overlapping plural plate springs such that elastic force of the latch spring is greater than elastic force of the second return spring.

15. The clutching device of claim 1, wherein:
the first rotation element is an input shaft and receives an output torque of an engine; and
the second rotation element is one rotation element of three rotation elements of a planetary gear set.

16. The clutching device of claim 1, wherein:
a third hydraulic line is formed in the first rotation element at a location between the first hydraulic line and the second hydraulic line so as to supply compensation hydraulic pressure to the second sealed space.

\* \* \* \* \*